May 29, 1945.　　　　L. C. GREER　　　　2,377,226
PHOTOGRAPHIC MARKING DEVICE
Filed July 23, 1943
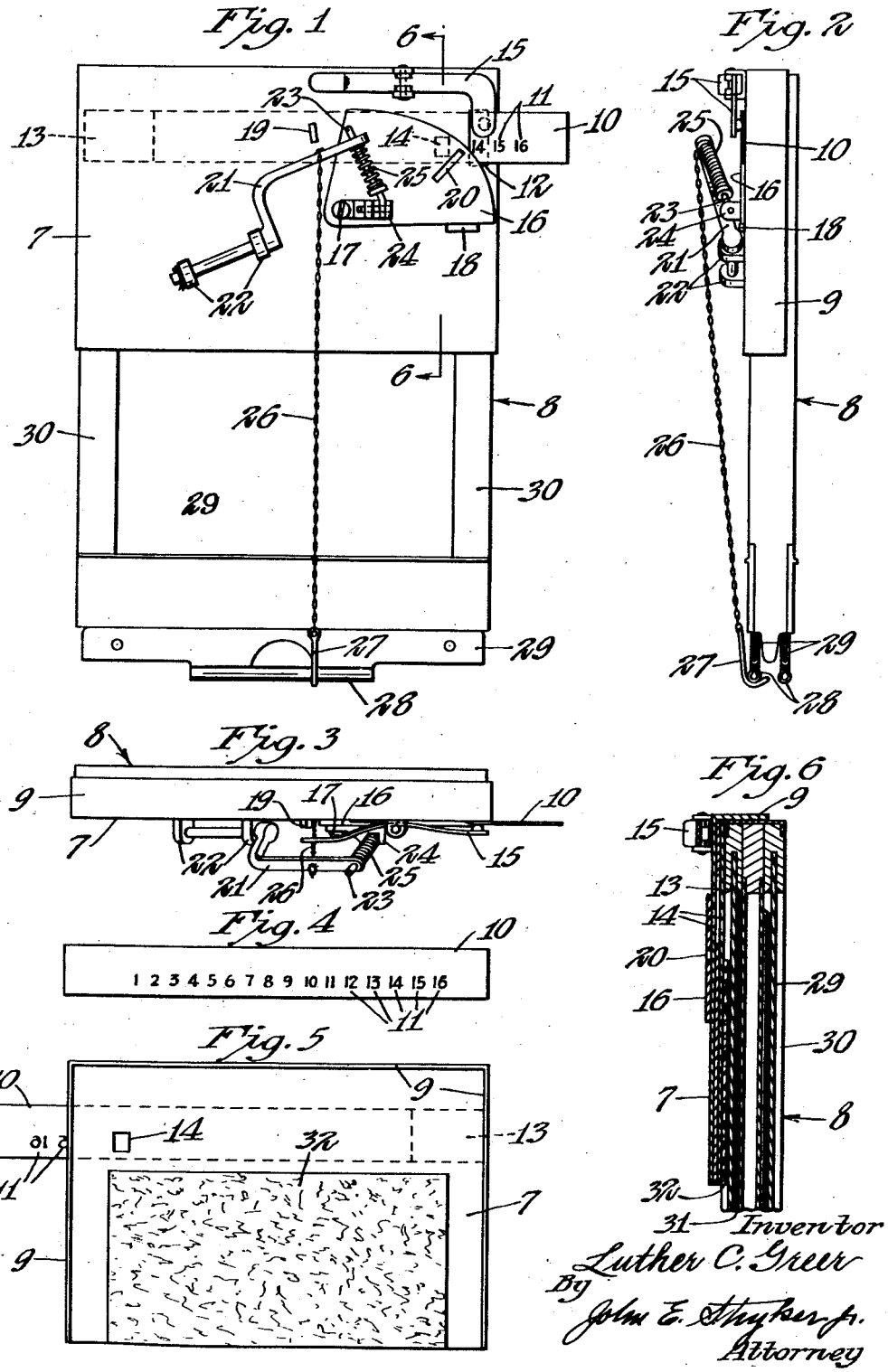
Inventor
Luther C. Greer
By John E. Stryker Jr.
Attorney Patented May 29, 1945

2,377,226

UNITED STATES PATENT OFFICE 2,377,226

PHOTOGRAPHIC MARKING DEVICE

Luther C. Greer, St. Paul, Minn.

Application July 23, 1943, Serial No. 495,808

2 Claims. (Cl. 95—1.1)

It is an object of this invention to provide a simple, compact and inexpensive device for photographically marking negatives for purposes of identification.

A particular object is to provide apparatus of this character which is adapted to photographically print identifying characters on sensitive films and plates contained in holders such as those commonly used by photographers.

Other objects will appear and be more fully pointed out in the following specification and claims.

With these objects in view, I provide a panel or plate which fits in contact with the frame and one of the sliding covers of an ordinary film holder and I mount on the panel means for reproducing identifying characters on the negatives contained in the holder in the form of shadowgraphs. To facilitate making the exposures my reproducing means include a shutter which is adapted to be operated simultaneously with the partial opening of the film cover. A transparent strip bearing a number of identifying characters is so associated with the shutter that any selected character or group of characters may be moved into registry with the shutter aperture. The identifying characters are preferably reproduced on a margin of the film where they do not deface the work or subject of the photograph. My device is designed to guard against accidental exposure of the main film area to stray light rays when the identifying characters are photoprinted on the film.

Referring to the accompanying drawing which illustrates the best form of my device at present known to me:

Figure 1 is a plan view of my device mounted on a film holder of common type;

Fig. 2 is a side elevation of the same as viewed from the right of Fig. 1;

Fig. 3 is an upper end view of the same;

Fig. 4 shows a transparent strip bearing suitable characters for reproduction on the negatives;

Fig. 5 is a bottom plan view of my device, and

Fig. 6 is a section taken on the line 6—6 of Fig. 1.

In the drawing, the numeral 7 indicates a mask panel which is formed to cover at least a portion of one face of a rectangular film holder 8 of common type. The panel 7 is preferably formed with flanges 9 adapted to fit in engagement with the edges of the holder 8 at an end and two parallel sides thereof. A transparent strip 10 bearing a series of characters 11 extends in through a slot 12 and along a guideway 13 formed on the inner face of the panel 7. The several characters on the strip 10 are adapted to be moved into registry with an aperture 14 formed in the panel 7 through which their images may be projected on the film in the holder 8. To frictionally retain the strip 10 in any selected position, a small leaf spring 15 is mounted on the panel 7 and has an end pressing against the film 10 where it emerges from the slot 12.

A thin shutter plate 16 lies flat on the panel 7 over the aperture 14 and has a pivot pin 17 connecting it to the panel so that this shutter member may be oscillated between stops 18 and 19. An aperture 20 is formed in the plate 16 to admit light through the aperture 14 when the shutter is operated. Toggle operating members for the shutter comprise an arm 21 pivoted in bearings 22 fixed on the panel 7 and a pin 23 connecting the free end of the arm 21 to a pivot bearing 24 on the shutter plate 16. A small coiled spring 25 is mounted on the pin 23 and is held under compression so that it extends the pin 23 from the arm 22 when the latter is operated and thereby imparts the desired quick movement to the shutter plate 16. To facilitate manual operation of the shutter, a small chain 26 is connected at one end to the arm 21 and is provided with a hook-shaped handle 27 which may be either grasped by the operator or placed in engagement with a handle 28 of a film cover 29 for operation in timed relation to the opening of the cover, as hereinafter more fully described. The film cover 29 is of the sliding type commonly provided on the film holder 8, being slidable between parallel guides 30 to allow access to one of the film compartments. Such holders are ordinarily adapted to contain two light sensitive films 31 (Fig. 6) which are accessible through the openings for the respective covers 29. The aperture 14 in the panel 17 is arranged to expose a small area of the margin of the adjacent film when the appropriate cover 29 is partially opened. To exclude stray light rays and make resilient contact with the film cover, I provide a sealing strip 32, of resilient material such as felt, extending across the inner or back face of the panel 7. This strip fits between the guides 30 and against the adjacent cover 29 when the apparatus is in use.

When a sensitive film 31 contained in the holder 8 is to be marked for identification, the operator moves the appropriate identifying character 11 into registry with the aperture 14 and then places the panel 7 on the film holder, as illustrated. With the shutter arm 21 in the raised position shown in the drawing, the operator now exposes the face of the device to a suitable light while he operates the shutter and opens the film cover 29 sufficiently to expose the film 31 momentarily through the aperture 14. This causes the image of the identifying character to be projected on the exposed margin of the film. The cover 29 is immediately closed and my device is finally removed from the film holder.

The foregoing operation may be performed either before or after exposure of the film in the camera. Ordinary development and fixing treatment of the exposed film brings out the images of the identifying characters in the form of shadowgraphs which may be used to identify the film with other records relating to the job. By providing the chain 26 which extends to the cover handle 28, I facilitate the coordination of the shutter operation with the partial opening of the cover 29. The operator may either grasp the handle 27 with the same hand that operates the cover or the handle 27 may be placed in engagement with the handle 28, as indicated in Figs. 1 and 2, for the coordinated operation. After each operation of the shutter the arm 21 is returned to its ready or cocked position illustrated.

It will be evident that my device is inexpensive, easy to operate and so compact that it may be readily carried about by the photographer for use in connection with work away from his studio.

Having described my invention, what I claim as new and desire to protect by Letters Patent is:

1. In combination with a film holder having a slidable cover and a handle for operating the cover projecting from an end thereof, a mask panel adapted to extend upon the outer face of said cover and holder along the opposite end thereof, said panel being formed with an aperture through which a small area of a film in said holder may be exposed when said cover is partially open, translucent means having an identifying character adapted to be placed in parallel relation to the film and in registry with said aperture, a shutter associated with said aperture and means adapted to extend substantially to said handle for operating the shutter in coordinated relation to the partial opening of said cover whereby said character and a predetermined area of the film may be momentarily exposed to light entering through said aperture.

2. For a film holder having a rectangular, removable cover, a handle on one end of said cover, parallel guides for said cover extending substantially from end to end of the holder along the opposite outer sides thereof and an end member connecting said guides, the end of said cover remote from said handle being disposed to close in contact with said end member and said cover being slidably removable from said guides to expose substantially the entire face of a film in said holder, an attachment comprising a mask panel adapted to extend upon the outer surfaces of said guides, cover and end member and having flanges adapted to embrace the outer edge surfaces of said guides and end member respectively, said panel being formed with an aperture through which a small area of a film in said holder may be exposed when said cover is partially open, a translucent strip having a series of characters thereon, means for supporting said strip for movement across said aperture, said strip being movable to carry any selected character into registry with said aperture and a shutter associated with said aperture for exposing selected characters on said strip to photographically reproduce the same on a film in said holder when said cover is in partially open position.

LUTHER C. GREER.